J. L. WILLIAMS.
COMBINATION TOOLS.
No. 190,397.　　　　　　　　　　　Patented May 1, 1877.
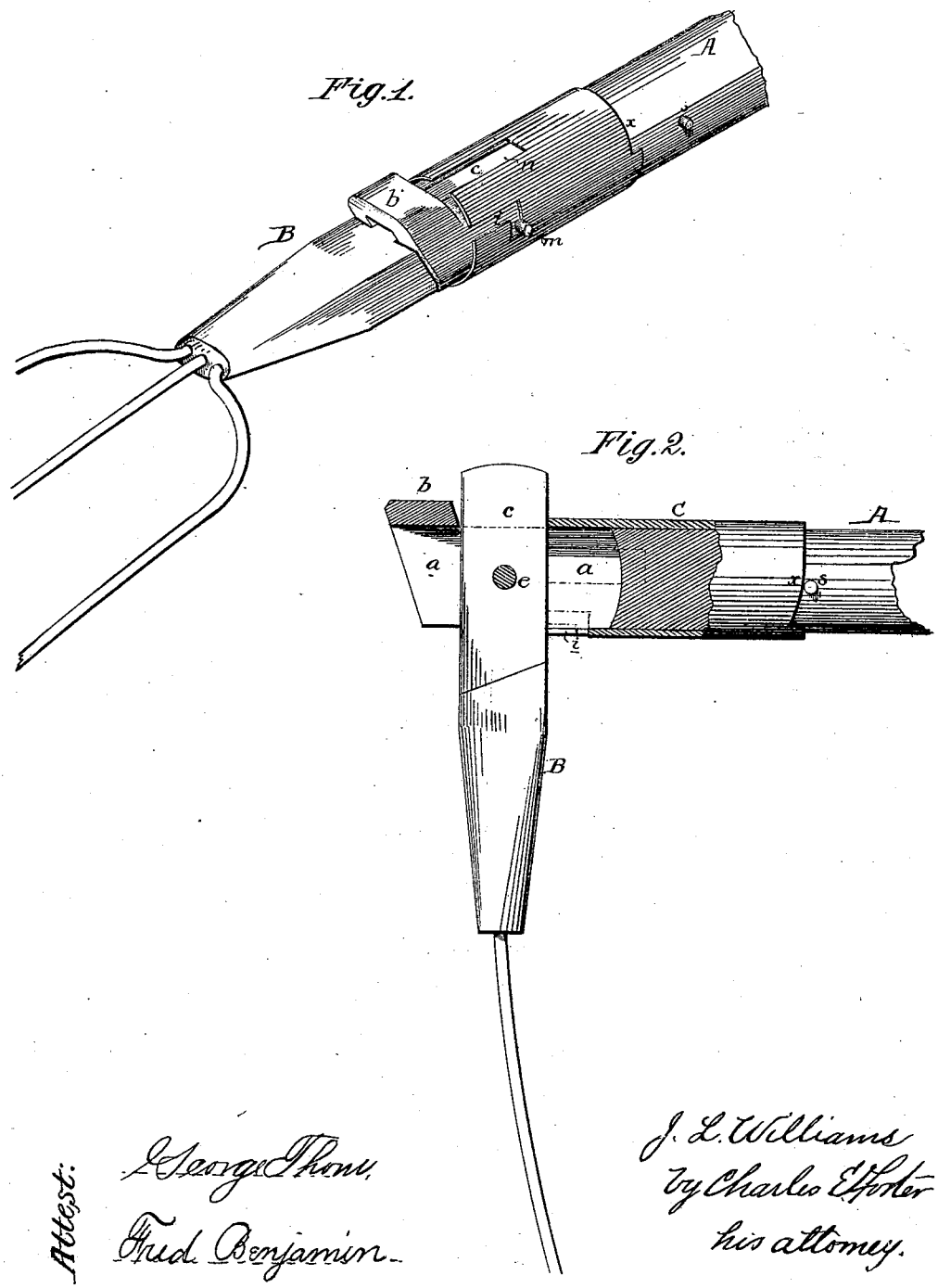

UNITED STATES PATENT OFFICE.

JOHN L. WILLIAMS, OF JESUPS JUNCTION, GEORGIA.

IMPROVEMENT IN COMBINATION TOOLS.

Specification forming part of Letters Patent No. 190,397, dated May 1, 1877; application filed December 19, 1876.

*To all whom it may concern:*

Be it known that I, JOHN L. WILLIAMS, of Jesups Junction, Wayne county, Georgia, have invented certain new Improvements in a Combination Tool, of which the following is the specification:

The object of my invention is a combination agricultural tool, constructed as fully described hereafter, to combine two implements capable of different functions.

In the accompanying drawing, Figure 1 is a perspective view, showing one form in which the improved tool may be used; and Fig. 2, a view, partly in section, showing the parts in a different position.

A represents the handle of the tool, or a socketed shank of metal adapted for attachment to the handle, in either case a slot, $a$, extending longitudinally from the outer end, and a brace, $b$, connecting the two sides. Into the slot $a$ extends the tongue $c$ of an arm, B, which is pivoted to the shank by a cross-pin, $e$, so that it can be turned either to the longitudinal position shown in Fig. 1, or at right angles, as shown in Fig. 2. A sleeve, C, turning and sliding on the shank A, secures the arm B in either position. For instance, when the arm B is in a longitudinal position, the sleeve, on being pushed forward, incloses the tongue $c$, and prevents any movement of the arm.

In order to secure the sleeve it has a bayonet slot, $i$, adapted to a pin, $m$, on the shank. When the arm B is to be brought to the position Fig. 2, the sleeve is turned and pushed back until its rear end strikes the pin $s$, and is then again turned to bring a slot, $n$, above the tongue $c$, when the arm may be adjusted as desired, and is secured by turning the sleeve until its inclined rear edge $x$, bearing upon the pin $s$, forces its opposite end against the side of the arm, bearing on it at both sides of the pin $e$, and effectually preventing any vibration upon the pin.

The arm B carries the blade of the tool—as, for instance, a hoe-blade, or a fork—the functions of which depend upon the position of the arm. Thus, when the latter is longitudinal the tool will serve as a fork or spade; when it is at right angles it will be a hoe or rake. When the arm B is longitudinal the cross-piece $b$ serves to resist the thrust upon the arm, relieving the sleeve C of many strains to which it would otherwise be subject, and when the arm is at right angles it still serves as a bearing at the front side of the arm.

Without confining myself to the precise construction and arrangement of parts described,

I claim—

1. The combination of the handle or shank A, the pivoted arm B, the sliding and rotating slotted sleeve C, and the locking device whereby the sleeve is retained when in its forward position, all as set forth.

2. The combination of the slotted handle or shaft A, pivoted arm B, and sleeve C, having a slot, $n$, and inclined rear edge $x$, as specified.

3. The combination of the shank A, pivoted arm B, sleeve C, and cross-piece $b$, for the purpose specified.

In testimony whereof I have signed my name to this specification in the presence of two subscribing witnesses.

JOHN L. WILLIAMS.

Witnesses:
MAC CARTER,
J. P. WOOTEN.